United States Patent [19]

Lilja et al.

[11] Patent Number: 4,936,687

[45] Date of Patent: Jun. 26, 1990

[54] MIXING APPARATUS AND METHOD

[75] Inventors: Jan E. Lilja; Sven E. L. Nilsson, both of Helsingborg, Sweden

[73] Assignee: Aktiebolaget Leo, Helsingborg, Sweden

[21] Appl. No.: 275,677

[22] Filed: Nov. 23, 1988

Related U.S. Application Data

[63] Continuation of Ser. No. 35,414, Apr. 7, 1987, abandoned.

[30] Foreign Application Priority Data

Apr. 7, 1986 [SE] Sweden ................................ 8601528

[51] Int. Cl.[5] ....................... B01F 13/08; G01N 21/01; G01N 21/17

[52] U.S. Cl. .................................... 366/143; 356/436; 366/274

[58] Field of Search ............... 366/142, 143, 117, 118, 366/273, 274; 356/39, 40, 41, 42, 440, 441, 442, 436

[56] References Cited

U.S. PATENT DOCUMENTS

| | | | |
|---|---|---|---|
| 3,219,318 | 11/1965 | Hershler | 366/273 |
| 3,439,899 | 4/1969 | Hershler | 366/273 X |
| 3,752,443 | 8/1973 | Lichtenstein | 366/274 |
| 3,784,170 | 1/1974 | Petersen et al. | 366/273 |
| 3,815,115 | 6/1974 | Inque | 366/273 |
| 3,987,967 | 10/1976 | Kuznetsov et al. | 366/273 |
| 3,997,272 | 12/1976 | George | 366/274 X |
| 4,090,263 | 5/1978 | Hoffa | 366/273 |
| 4,131,370 | 12/1978 | Lawrence et al. | 366/273 |
| 4,227,815 | 10/1980 | Hoffa | 366/273 X |
| 4,338,169 | 7/1982 | Bienvenu | 204/155 |
| 4,390,283 | 6/1983 | Meyer | 366/273 |
| 4,549,812 | 10/1985 | Bothorel et al. | 366/273 X |

FOREIGN PATENT DOCUMENTS

| | | | |
|---|---|---|---|
| 0008210 | 3/1980 | Japan | 366/273 |
| 59-49834 | 3/1984 | Japan | 366/273 |
| 59-52539 | 3/1984 | Japan | 366/273 |
| 59-145053 | 8/1984 | Japan | 366/273 |
| 60-347262 | 2/1985 | Japan | 366/273 |

*Primary Examiner*—Harvey C. Hornsby
*Assistant Examiner*—Scott J. Haugland
*Attorney, Agent, or Firm*—Antonelli, Terry, Stout & Kraus

[57] ABSTRACT

An apparatus for performing mixing in thin liquid layers containing a suspension of a multiplicity of movable particles of magnetic material. The apparatus includes at least two magnets or magnet systems, of which at least one is an electromagnet. the magnets or magnet systems are arranged in order to provide at least one slit for receiving at least one support containing the thin liquid layer, wherein the magnetic particles are present. When the liquid layer in the support is inserted in the slit, the thin layer will be subjected to the combined magnetic field orginating from the two magnets or magnet systems. The apparatus has a driving source for the electromagnet(s), including a timing device, and a current source. The support device, which fixedly supports the thin liquid layer containing a multiplicity of magnetic particles, is arranged between the magnets in such a manner that the thin layer is subjected to the combined magnetic field of the magnets, which magnetic field alternatingly concentrates and fades out.

The invention also provides a method of performing mixing in thin liquid layers.

30 Claims, 4 Drawing Sheets

MIXING APPARATUS AND METHOD

This application is a continuation of application Ser. No. 07/035,414, filed Apr. 7, 1987, now abandoned.

FIELD OF THE INVENTION

The present invention concerns an apparatus and a method for treating liquids. More particularly the invention concerns an apparatus and a method for mixing one or more liquids using magnetic particles which, subsequent to the mixing, may be transported to predetermined areas.

PRIOR ART

Swedish Patent No. 221,918 (corresponding to U.S. Pat. No. 3,219,318) discloses an apparatus and a method for mixing liquids using magnetic particles. More specifically, the patent discloses an apparatus achieving a magnetic field that varies as regards intensity and direction in order to keep the magnet particles at a distance from each other and give them a rotational and/or translational movement. The magnetic field is obtained by using a solenoid. Optionally the apparatus can include a collar of magnetic material. The magnetic particles used are permanent magnets. Furthermore, it is disclosed that a separate permanent magnet can be arranged close to the mixing zone in order to obtain a stronger mixing within predetermined parts of the fluid. An essential difference between this previously known apparatus and mixing method and the present invention, which also uses small magnetic particles in order to effect mixing, concerns the mixing process. According to the present invention the mixing process comprises one component that can be characterized as a reciprocating transporting motion or movement of the magnetic particles. Optionally this component can be combined with another component, which consists of the rotation of each individual particle around its own centre of gravity. The transporting function that can be a reciprocating radial or lateral motion can be used for retaining particles in preselected areas after completed mixing. This feature constitutes an important part of the present invention, which is not disclosed in the Swedish patent. The mixing process according to the present invention is achieved by using the combined magnetic field effect originating from at least two different magnets.

Another mixing apparatus is disclosed in the U.S. Pat. No. 3,752,443. According to this patent the magnetic particles are subjected to a centrifugal force generated by a rotating permanent magnet. The centrifugal force is balanced by the influence of a second permanent magnet in order to obtain a substantially uniformity of distribution of the magnetic particles. The apparatus known from this patent differs from the apparatus according to the present invention, inter alia in that it comprises movable parts and in that it cannot be used for retaining the magnetic particles in preselected areas.

The U.S. Pat. No. 4,338,169 (corresponding to European Patent Application No. 0014109) discloses another apparatus involving magnetic fields and particles of magnetic material dispersed in a fluid medium. However, according to this invention the magnetic particles are not inert but take part in the reactions occuring in the fluid.

OBJECT OF THE INVENTION

One object of the invention is to provide an apparatus and a method for mixing liquids using magnetic particles which can be transported to and retained at preselected areas after completed mixing.

A second object is to provide an apparatus and a method for mixing small volumes for e.g. analytical purposes.

A third object is to provide a small mixing apparatus or mixing unit without any movable parts.

A forth object is to provide a small mixing unit that can be built-in in a portable instrument.

A fifth object of the invention is to provide a flexible system for mixing liquids using magnetic particles.

SUMMARY OF THE INVENTION

The present invention concerns an apparatus for performing mixing in thin liquid layers containing a suspension of a multiplicity of movable particles of magnetic material. The apparatus comprises at least two magnets or magnet systems, of which at least one is an electromagnet. The magnets or magnet systems are arranged in order to provide at least a slit for receiving at least a support means containing the thin liquid layer, wherein the magnetic particles are present. When the liquid layer in the support means is inserted in the slit, the thin layer will be subjected to the combined magnetic field originating from the two magnets or magnet systems. The apparatus also comprises driving means for the electromagnet or electromagnets, timing means and a current source. The support means, which fixedly supports the thin liquid layer containing a multiplicity of magnetic particles, is arranged between the magnets in such a manner that the thin layer is subjected to the combined magnetic field of the magnets, which magnetic field alternatingly concentrates and fades out.

The invention also comprises a method of performing mixing thin liquid layers. According to the method, a magnetic field is generated by activating at least one electromagnet. At least one other magnetic field is generated by at least one permanent magnet and/or by activating one or more other electromagnets. The thin liquid layer or layers are subjected to the combined magnetic field generated by the magnets. At least one field repeatedly changes direction to impart a laterally transporting and optionally a rotating motion to the magnetic particles.

DETAILED DESCRIPTION OF THE INVENTION

Figure 1A:
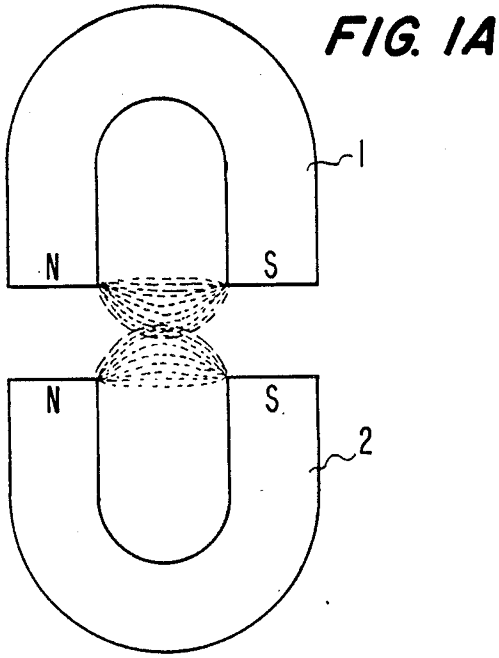
FIG. 1A and 1B illustrate the principle of the invention.
Figure 1B:
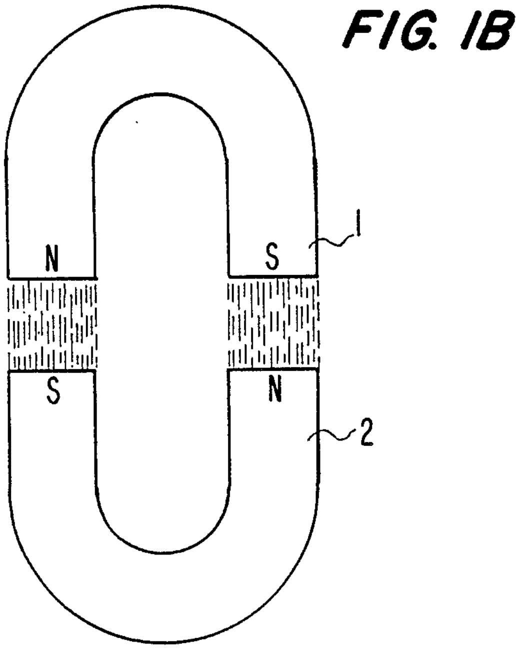

The principle of the present invention is disclosed in FIG. 1A and 1B, wherein 1 and 2 are magnets having their poles facing each other. At least one of the magnets is an electromagnet which is connected to a polarity shifting DC source (not shown). The combined magnetic field generated when both of the magnets interact is marked out by the dashed lines. If, as is assumed in this embodiment, the magnets are of equal strength, there will be alternatingly a concentration and fading out of the combined magnetic field in an area in a plane between and parallel to the magnetic poles and at equal distance from each pair of poles, the area being centrally located with respect to each pair of poles.

Figure 2A:
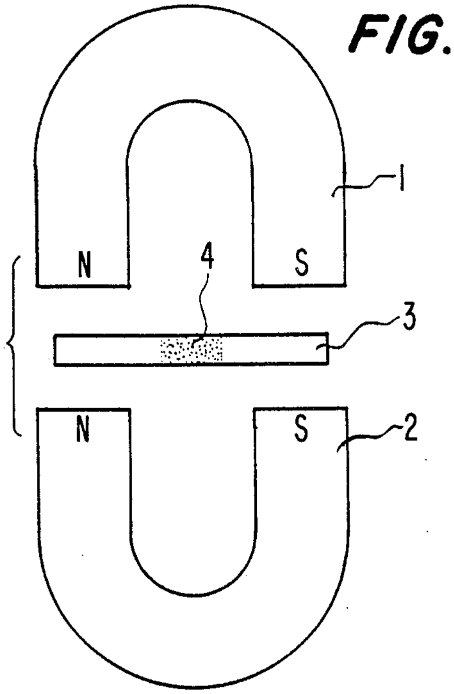
FIG. 2A and 2C are sectional views illustrating the principle of the invention applied on a liquid volume containing magnetic particles.
Figure 2B:
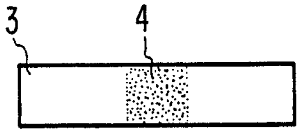
FIG. 2B and 2D are top plan views illustrating a magnetic particle distribution pattern.
Figure 2C:
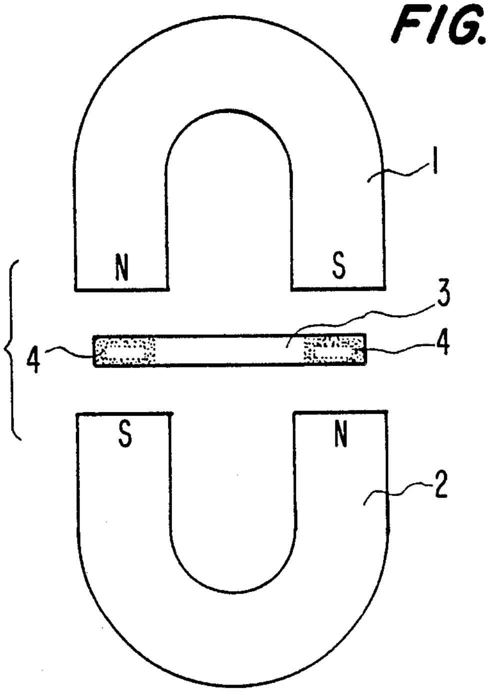

The influence of the magnets on a multiplicity of magnetic particles 4 in a liquid layer of a support 3 is disclosed in FIG. 2A and 2C. When both magnets are driven by AC, each of the magnetic particles is imparted a rotational movement around its centre of gravity, and a reciprocating lateral movement is obtained, when the magnets repeatedly and alternatingly are driven in phase and in antiphase to each other, to and away from the area centrally located around an axis through the centre of the container 3 and perpendicular to its extension, in which area the magnetic field alternatingly concentrates (FIG. 2A) and fades out (FIG. 2C).

FIG. 2B illustrates the top view of the pattern formed by the multiplicity of magnetic particles 4 in the support when the opposite poles have a square or rectangular form and are of the same polarity, i.e., both are north poles or both are south poles respectively.

Figure 2D:
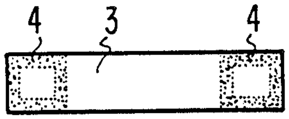

FIG. 2D illustrates a top view of pattern formed when the opposite poles are of different polarity. In this connection it should be pointed out that also the distance between the magnets influences the form and appearance of the areas with magnetic particles. The closer the magnets 1, 2 are, the more marked the profiles of the magnetic poles in the particle area become.

Figure 3A:
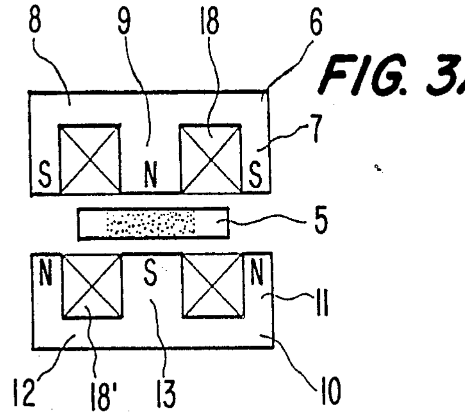
FIG. 3A and 3C illustrate a further embodiment of the invention.
Figure 3B:
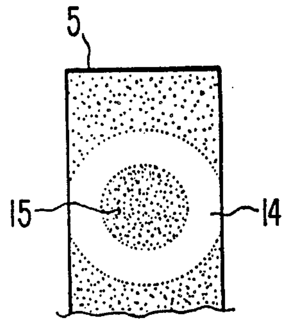
FIG. 3B and 3D are top plan views illustrating another magnet distribution pattern.
Figure 3C:
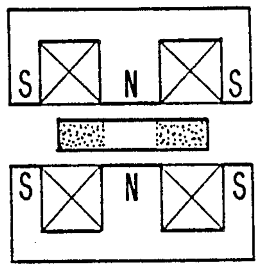

FIG. 3A and 3C disclose another arrangement of the magnets 6, 10 in the apparatus according to the present invention. In this embodiment two identical magnets 6, 10 are facing each other. Each magnet 6, 10 comprises a cylindrical wall 7, 11, a circular bottom plate 8, 12 and an inner cylinder 9, 13, the wall, bottom and cylinder being in one piece. The cylinder extends perpendicularly from the centre of the bottom plate 8, 12. An elongated support 5 is arranged in a slit centrally positioned between the magnets 6, 10. An electrical coil 18, 18' surrounds each inner cylinder 9, 13. The coils 18, 18' are connected to current sources, each of which can be a DC source or an AC source as in FIG. 5.

Figure 3D:
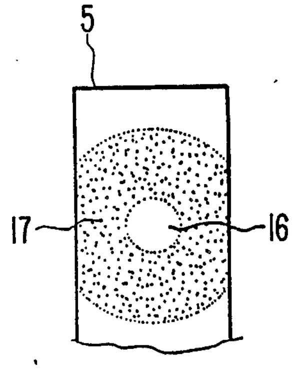

The patterns formed by the magnetic particles, when the coils 18, 18' are energized and the magnets are activated so that the resulting magnetic fields are alternatingly working to reinforce each other and to fade each other out, are depicted as 14, 15, 16 and 17 in FIG. 3B and 3D, respectively.

Not specifically shown but within the scope of the invention is also an embodiment according to FIG. 3A and 3C, wherein only one coil 18 or 18' is provided and the remaining magnet 6 or 10 is a permanent magnet.

Figure 4:
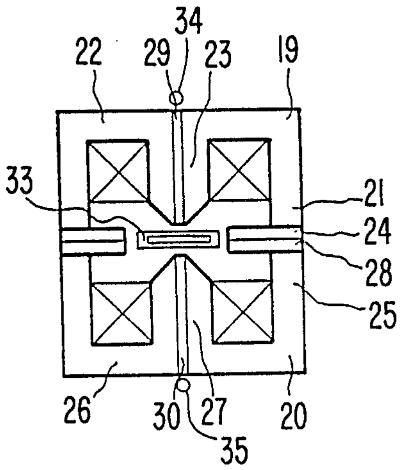
FIG. 4 is a sectional view illustrating a further arrangement of magnets of the apparatus according to the invention.

FIG. 4 discloses a further embodiment of the invention. In this embodiment the magnets 19, 20 are arranged as in FIG. 3A, C and each magnet 19, 20 comprises a cylindrical wall 21, 25, a circular bottom plate 22, 26 and an inner cylinder 23, 27, the end of which has the shape of a cone. Furthermore, each magnet 19, 20 has a collar 24, 28 on the cylindrical wall 21, 25 extending towards the support or container 33, which is arranged centrally between the cones of the inner cylinders 23, 27 and the annular collars 24, 28.

When the support 33 is inserted in or taken out from the slit of the apparatus, the magnets are taken apart. Alternatively a grove can be provided in the collars 24, 28.

Furthermore, there is provided a hole 29, 30 through the inner cylinder 23, 27 of each magnet 19, 20.

This embodiment of the invention is especially adapted for use in optical assays of liquid/reagents in the support 33, which e.g. has the form of a microcuvette having plane-parallel walls of transparent material. The volume of the cuvette may vary between 0.1 μl-1 ml. The thin liquid layer within the support, e.g. the cuvette, may vary between 0.01 and 2.00 mm, preferably 0.1 and 1.0 mm.

The change of colour, intensity, turbidity etc. during or subsequent to a mixing operation when the magnets 19, 20 are activated as previously described is measured by a detector arranged at one opening of the hole 29, 30 and opposite to a light emitting device arranged on the opposite side of the container or support. The assay is performed when the mixing action is completed, the phase shifting of the magnet or magnets 19, 20 is interrupted and the centre of the cuvette in the path of the light is depleted of magnetic particles, which are actively locked in predetermined positions by the combined magnetic field.

It is obvious to the man skilled in the art that the poles can be designed and arranged in a wide variety of different ways, which makes it possible to solve a great variety of mixing and transporting problems in thin liquids. It is also obvious that by arranging more than two magnets, the flexibility of the mixing system is highly increased.

According to one embodiment of the invention the support member containing the thin liquid layer is inserted in the slit arranged between at least two opposing poles of at least two different magnets, the poles opposing each other, within an angle 36 of at most 160°, preferably 0°-80°, and especially 0°-20°, with respect to the centre of each.

The remaining poles of the magnets may be arranged essentially in the plane of the thin layer and adjacent to the circumference of the layer. Each magnet can have the shape of a cylinder with a coaxial annular recess at one end. This recess is intended for receiving the activating coil of the magnet. The recess defines the core of the magnet. Furthermore, the slit may be arranged in such a way that the thin liquid layer when inserted into the slit will be arranged between at least two opposing poles of at least two different magnets around a common central axis or plane through the poles. The core of each magnet could have a through hole extending along its central axis. This through hole makes it possible to perform the optical analysis discussed above. An important advantage that can be obtained according to the present invention concerns the possibility of transporting the magnetic particles to one or more different areas within the support depending on the arrangement of the magnets or magnet systems, their number, the design of the poles and the driving function. Consequently, it is possible to transport the magnetic particles from one end of an elongated support to the other by sequentially activating and deactivating different magnets along the support.

In the same way as it is possible to transport the magnetic particles to preselected areas it is also possible to transport the particles from preselected areas by timely interrupting the activation or phase shifting of the magnet or magnets. This inherent property of the apparatus according to the invention is important for e.g. optical assays when the area subjected to the light beam must be free from magnetic particles (c.f. the arrangement according to FIG. 4). The geometrical form of the magnets determines where in the liquid layer the particles will be locked by the magnetic field(s).

The magnets used according to the present invention can be electromagnets or a combination of permanent magnets and electromagnets. When driven by AC, it is preferred that most of the magnets be electromagnets. When DC is used, preferably half of the magnets are permanent magnets.

If the apparatus according to the present invention comprises a mixture of electromagnets and permanent magnets, the electromagnets can be driven by polarity shifting DC having a shifting frequency varying between 0.001 and 10 Hz. Alternatively, all the magnets of the apparatus can be electromagnets driven by polarity shifting DC or phase shifting AC, and the AC frequency can vary between 0.01 hz and 100 kHz and the polarity or phase shifting frequency between 0.001 and 10 Hz.

When a magnet combination including an electromagnet and a permanent magnet is used, the electromagnet can be driven by either an alternating DC voltage or a constant DC voltage. In the first case the electromagnet and the permanent magnet cooperate in order to generate a repeatedly changing magnetic field across the thin liquid layer in the support, whereby the field provides an essentially linear or lateral movement of the magnetic particles and a mixing action is obtained. When the electromagnet is driven by a constant DC voltage, a locking of each separate magnetic particle in a predetermined position in the layer will be obtained.

If, on the other hand, a combination including two electromagnets is used, each of the electromagnets can be driven by a AC voltage, the reciprocal phase shift of which could be varied between 0° and 180°. When, in this case, the voltages from the two electromagnets cooperate, the magnetic field across the thin liquid layer will provide an essential linear or lateral movement of the magnetic particles. When, on the other hand, the voltages from the two electromagnets counteract, a magnetic field across the thin liquid layer will lock each separate magnetic particle in a predetermined position in the liquid layer.

For most applications where few magnets are used it is advantageous to use magnets having a central and a peripheral pole (cf. FIG. 3 and 4).

In applications using a larger number of magnets, each pole of each magnet can be arranged so as to face a pole of another magnet, and a sequence of poles can thus be arranged on opposite sides of a support means including one or more thin liquid layers along its extension. By using this arrangement in combination with a preprogrammed activation/deactivation of the magnets, the magnetic particles can be transported from one end of the support to another.

The field strengths of the magnets are chosen depending on the distances of the poles of the magnets from the liquid layer or layers in the support, on the distance and the strength of the pole of the facing magnet and on the desired function.

Figure 5:
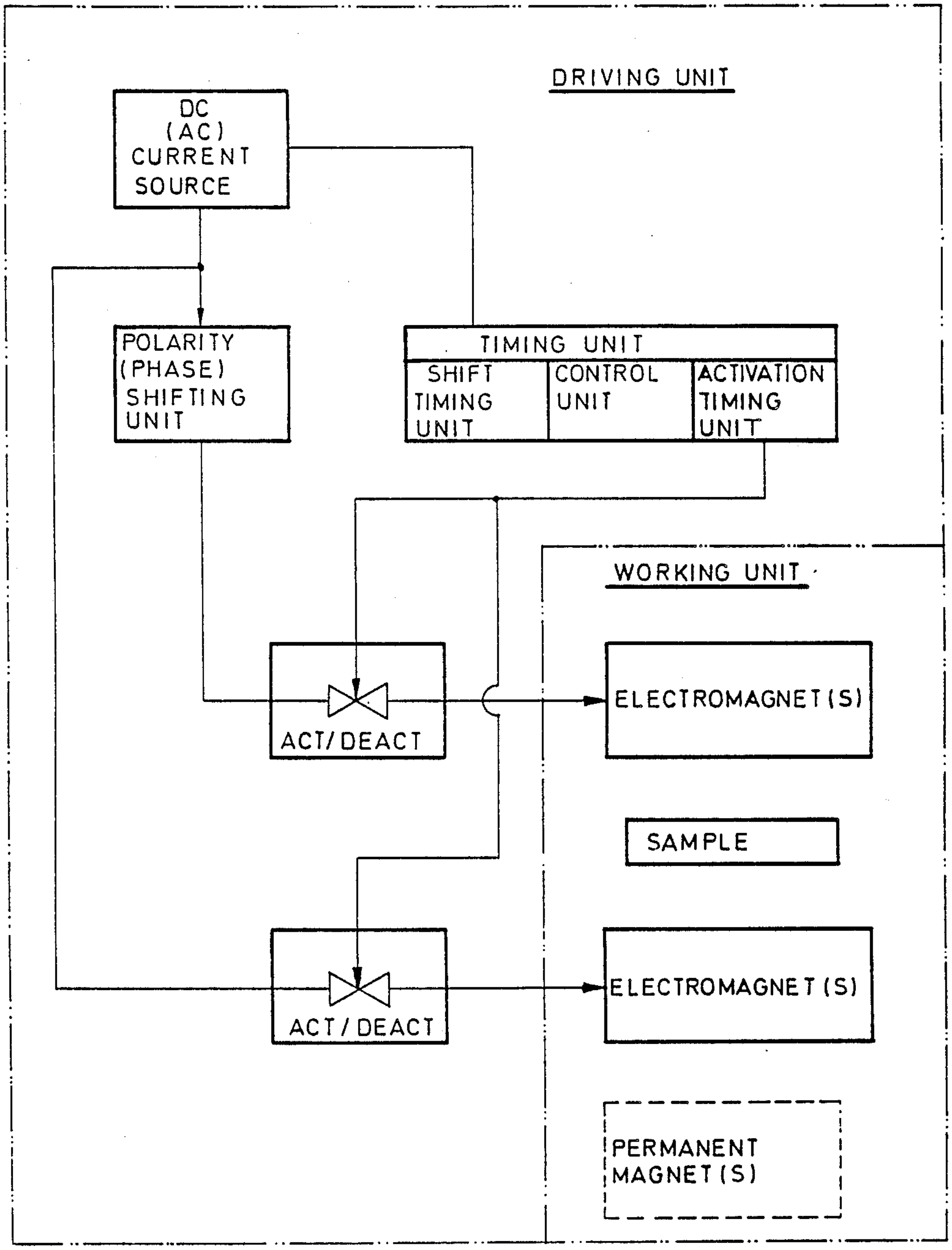
FIG. 5 is a block diagram of apparatus according to the invention.

The apparatus according to the invention consists of several functional units as illustrated in FIG. 5. The two main parts, the driving unit and the working unit, can be placed physically apart from each other. The driving unit involves a current source capable of delivering suitable DC and/or AC voltages for the other parts of the apparatus. It also contains means for polarity or phase shifting the current to one or some of the electromagnets in the working unit. Also there might be included means for activating or deactivating the electromagnets. These controlled switches are not always needed when the apparatus contains few electromagnets, but is advantageous with a larger system. These means could also involve a voltage controlling circuit to provide a selected voltage for the individual electromagnets. A timing unit provides means for timed control of the polarity or phase shifting unit and the activating/deactivating means. The timing unit is preferably programmable, but for simple operation regimes this is not needed. For a more complex system, this unit also could provide control of different voltages and computing power. It is obvious to the man skilled in the art that the driving unit can be designed in a wide variety of different ways with the tools of modern electronics.

In the following the invention is explained in further details with reference to FIG. 3A, C, where the magnet 6 is a permanent magnet. The mixing effect is obtained by driving the coil 18' of the electromagnet 10 with polarity shifting DC with a current giving a magnetic field strength of about the same magnitude as the field from the permanent magnet. The shifting period depends on the field strength, the magnetic particles, the design of the support, the viscosity of the liquid and the desired mixing effect and can vary from 0.001 sec. to 60 sec. The arresting of the movement of the magnetic particles is achieved by simply stopping the polarity shifting in the desired mode..

When AC is used, the permanent magnet 6 of the above example is exchanged for a constantly AC driven electromagnet, and the other magnet 10 is driven by phase shifting AC instead of polarity shifting DC. The frequency of the AC is preferably the same as the line voltage, e.g. 50/60 Hz, but practically any frequency can be used.

The support for the liquid volume can have any shape and should consist of non-magnetic material such as, e.g. glass, plastic, ceramic or non-magnetic metals. According to one preferred embodiment of the invention, the container has the form of a cuvette such as described in the U.S. Pat. No. 4,088,448.

The expression "magnetic particles" referred to in this text is meant to include particles that are influenced by a magnetic field. They may consist of purely ferromagnetic material or a ferro-magnetic material coated or mixed with another material such as a polymer, a protein, a detergent, a lipid or a non-corroding material. The size of the particles can vary from 0.001 μm to 1 mm. The size as well as the composition of the particles depends on the intended use and the design of the container. The magnetic material is preferably not permanently magnetic but permanently magnetic particles can be used. Preferably the particles are essentially inert to the surrounding liquid and reactions occuring therein and suspended in the liquid volume subjected to the mixing processes.

EXAMPLE

A Hemocue microcuvette for optical measurement is prepared with sodium hydroxide, sodium carbonate and nitrobluetetrazoliumchloride as in the Fructosamine Test (Roche). The exact amount of the reagent depends on the volume of the microcuvette. 0.1 mg ferrite particles (2 μm) are also included inside the microcuvette. The amount of magnetic particles depends on the volume of the microcuvette, the magnetic material and the size of the particles and can easily be determined by a person skilled in the art. The microcuvette is filled with blood serum and inserted into an apparatus according to FIG. 4 and the working unit in FIG. 5. The two essentially identical electro magnets are connected to the driving unit according to FIG. 5. The optical unit of a photometer is arranged so that the light path can traverse the central holes of the two electromagnets and the microcuvette, and the optical changes of the reaction mixture can be registered. The electromagnets are activated and the polarity unit is set to shift every five seconds. The magnetic particles are forced to alternate from one position to the other as roughly indicated in FIG. 3B and 3D every five seconds. After two minutes the polarity shifting unit is locked in the polarity giving the pattern of magnetic particles that is indicated in FIG. 3D and the optical measurement takes place in the central area that is now depleted of magnetic particles, which are actively held or locked by the magnetic field in the peripheral area of the cuvette cavity.

We claim:

1. Apparatus for mixing and analyzing a liquid contained in a microcuvette, together with a plurality of magnetic particles having particle sizes under 1 mm. in maximum cross-section, said apparatus comprising:
   two magnets, a first one of said magnets being an electromagnet, each magnet having a longitudinally extending outer magnetic pole member and a longitudinally extending inner magnetic pole member, said two magnets being positioned with their outer magnetic pole members substantially longitudinally aligned with each other and their inner magnetic pole members substantially longitudinally aligned with each other, with a gap between the adjacent ends of the two inner magnetic pole members for receiving between the two inner magnetic pole members the microcuvette containing the liquid and magnetic particles in a thin liquid layer to subject the liquid and magnetic particles to the combined magnetic field of said two magnets;
   means for performing an optical analysis on the liquid when the microcuvette is received within the gap between the two inner magnetic pole members; and
   means for driving said first magnet with a polarity shifting current.

2. Apparatus as claimed in claim 1 wherein said driving means includes means for shifting the polarity of the current with a polarity shifting frequency of between 0.001 Hz and 10 Hz.

3. Apparatus as claimed in claim 1 wherein the gap is a substantially planar slit extending substantially perpendicularly to the longitudinal axes of said inner magnetic pole members.

4. Apparatus as claimed in claim 1 wherein the second one of said magnets is an electromagnet.

5. Apparatus as claimed in claim 4 wherein said driving means comprises means for driving said first and second magnets with an alternating current having a frequency of between 0.01 Hz and 100 Hz, and means for causing 180° phase shifting of the alternating current driving one of said magnets at a phase shifting frequency of between 0.001 Hz and 10 Hz.

6. Apparatus as claimed in claim 1 wherein the outer magnetic pole member of each magnet comprises an outer wall member and a bottom plate member bridging the outer wall member, and the inner magnetic pole member extends substantially perpendicularly from said bottom plate member.

7. Apparatus as claimed in claim 6 wherein the outer wall member of each magnet comprises a peripheral wall member, and the inner pole member extends from substantially the center of said bottom plate member.

8. Apparatus as claimed in claim 7 wherein each peripheral wall member is substantially circular.

9. Apparatus as claimed in claim 8 wherein each inner pole member is a cylindrical pole member.

10. Apparatus as claimed in claim 9 wherein the inner end of each inner pole member terminates in a cone shape.

11. Apparatus as claimed in claim 7 wherein each magnet further has a peripheral collar member overlying the peripheral wall member, extending inwardly from said peripheral wall member toward the gap, and magnetically coupling the peripheral wall members of said two magnets.

12. Apparatus as claimed in claim 11 wherein each peripheral wall member is substantially circular.

13. Apparatus as claimed in claim 12 wherein each inner pole member is a cylindrical pole member.

14. Apparatus as claimed in claim 13 wherein the means for performing comprises a hole extending longitudinally through each of the inner magnetic pole members, the two magnets being positioned with the holes substantially aligned to permit the optical analysis.

15. Apparatus as claimed in claim 14 wherein the inner end of each inner pole member terminates in a cone shape.

16. Apparatus as claimed in claim 11 wherein each collar member has a substantially constant radial dimension over the periphery thereof.

17. Apparatus as claimed in claim 11 wherein the collar members of the two magnets extend inwardly in alignment, with the gap therebetween.

18. Apparatus as claimed in claim 7 wherein each of said peripheral wall members is a continuous, non-interrupted wall member.

19. Apparatus as claimed in claim 1 wherein said performing means includes means for inhibiting polarity shifting of said driving means, with the combined magnetic field retaining an optical path through the support member and liquid layer.

20. Apparatus for mixing and analyzing liquids comprising:
   two magnets, a first one of said magnets being an electromagnet, each magnet having a longitudinally extending outer magnetic pole member and a longitudinally extending inner magnetic pole member, the two magnets being positioned with their outer magnetic pole members substantially longitudinally aligned with each other and their inner magnetic pole members substantially longitudinally aligned with each other, with a gap between the adjacent ends of the two inner magnetic pole members for receiving between the two inner magnetic pole members a support member containing a thin liquid layer to subject the thin liquid layer to the combined magnetic field of said two magnets, each inner magnetic pole member having a hole extending longitudinally therethrough to permit optical analysis of the thin liquid layer when a support member is received within the gap between the two inner magnetic pole members; and means for driving said electromagnet with a polarity shifting current.

21. A method of mixing and analyzing a liquid comprising:

providing the liquid in a thin liquid layer within a microcuvette having therein a plurality of magnetic particles with particle sizes under 1 mm. in maximum cross-section;

subjecting the liquid and the magnetic particles within the microcuvette to the combined magnetic field of two magnets, one of which is an electromagnet;

repeatedly changing the polarity of the magnetic field of the electromagnet to move the magnetic particles and thereby to mix the liquid layer;

interrupting the changing of the magnetic field polarity to retain the magnetic particles in a first preselected area within the liquid layer, with a second preselected area within the liquid layer depleted of magnetic particles; and subjecting the liquid within the second preselected area to optical analysis.

22. A method as claimed in claim 21 wherein the polarity of the magnetic field is changed with a polarity shifting frequency of between 0.001 Hz and 10 Hz.

23. Apparatus for mixing and analyzing liquids comprising:

two electromagnets, each electromagnet having a longitudinally extending outer magnetic pole member and a longitudinally extending inner magnetic pole member, said two electromagnets being positioned with their outer magnetic pole members substantially longitudinally aligned with each other and their inner magnetic pole members substantially longitudinally aligned with each other, with a gap between the adjacent ends of the two inner magnetic pole members for receiving between the two inner magnetic pole members a support member containing a thin liquid layer to subject the thin liquid layer to the combined magnetic field of said two electromagnets;

means for performing an optical analysis on the thin liquid layer when a support member is received within the gap between the two inner magnetic pole members;

means for driving said electromagnets with an alternating current having a frequency of between 0.01 Hz and 100 Hz; and means for causing 180° phase shifting of the alternating current driving one of said electromagnets at a phase shifting frequency of between 0.001 Hz and 10 Hz.

24. Apparatus for mixing and analyzing liquids comprising:

two magnets, a first one of said magnets being an electromagnet, each magnet having a first magnetic pole, in the form of a longitudinally extending substantially circular, peripheral outer wall member and a bottom plate bridging the outer wall member, and a second magnetic pole, in the form of a longitudinal member extending substantially perpendicularly from substantially the center of the associated bottom plate, the two magnets being positioned with their first magnetic poles substantially longitudinally aligned with each other and their second magnetic poles substantially longitudinally aligned with each other, with a gap between the adjacent ends of the two second magnetic poles for receiving between the two second magnetic poles a support member containing a thin liquid layer to subject the thin liquid layer to the combined magnetic field of said two magnets;

means for performing an optical analysis on the thin liquid layer when the support member is received within the gap between the two second magnetic poles; and means for driving said first magnet with a polarity shifting current.

25. Apparatus for mixing and analyzing liquids comprising:

two magnets, a first one of said magnets being an electromagnet, each magnet having a first magnetic pole in the form of a longitudinally extending outer peripheral wall member a bottom plate bridging the outer wall member, and a peripheral collar member overlying the associated peripheral wall member, extending inwardly from the associated peripheral wall member, and magnetically coupling the first magnetic poles of said two magnets, and a second magnetic pole in the form of a longitudinal member extending substantially perpendicularly from substantially the center of the associated bottom plate member, said two magnets being positioned with their first magnetic poles substantially longitudinally aligned with each other and their second magnetic poles substantially longitudinally aligned with each other, with a gap between the adjacent ends of the two second magnetic poles and within the two peripheral collar members for receiving between the two second magnetic poles a support member containing a thin liquid layer to subject the thin liquid layer to the combined magnetic field of said two magnets;

means for performing an optical analysis on the thin liquid layer when a support member is received within the gap between the two inner magnetic poles; and means for driving said first magnet with a polarity shifting current.

26. Apparatus for mixing and analyzing liquids comprising:

two magnets, a first one of said magnets being an electromagnet, each magnet having a longitudinally extending outer magnetic pole member and a longitudinally extending inner magnetic pole member, said two magnets being positioned with their outer magnetic pole members substantially longitudinally aligned with each other and their inner magnetic pole members substantially longitudinally aligned with each other, with a gap between the adjacent ends of the two inner magnetic pole members for receiving between the two inner magnetic pole members a support member containing a thin liquid layer together with a plurality of magnetic particles to subject the thin liquid layer and magnetic particles to the combined magnetic field of said two magnets;

means for performing an optical analysis on the thin liquid layer when a support member is received within the gap between the two inner magnetic pole members;

means for driving said first one of said magnets with an alternating current; and means for periodically causing 180° phase shifting of the alternating current driving said one of said magnets.

27. Apparatus as claimed in claim 26 wherein said phase shifting means comprises means for causing the phase shifting at a phase shifting frequency of between 0.001 Hz and 10 Hz.

28. Apparatus as claimed in claim 26 wherein said driving means comprises means for driving said first one of said magnets with an alternating current having a frequency of between 0.01 Hz and 100 Hz.

29. Apparatus for mixing and analyzing liquids comprising:

two magnets, a first one of said magnets being an electromagnet, each magnet having a first magnetic pole, in the form of a longitudinally extending outer wall member with a bottom plate member bridging the outer wall member, and a second magnetic pole, in the form of a longitudinally extending member extending substantially perpendicularly from the associated bottom plate member, said two magnets being positioned with their outer wall members substantially longitudinally aligned with each other and their longitudinally extending members substantially longitudinally aligned with each other, with a gap between the adjacent ends of the two longitudinally extending members for receiving between the two second magnetic poles a support member containing a thin liquid layer together with a plurality of magnetic particles to subject the thin liquid layer and magnetic particles to the combined magnetic field of said two magnets, each of the first magnetic poles further including a collar member overlying the associated outer wall member and extending inwardly from the outer wall member toward the gap to magnetically couple the outer wall members of the two magnets;

means for performing an optical analysis on the thin liquid layer when a support member is received within the gap between the two inner magnetic pole members; and means for driving said first magnet with a polarity shifting current.

30. Apparatus for mixing and analyzing liquids comprising:

two magnets, a first one of said magnets being an electromagnet, each magnet having a longitudinally extending outer magnetic pole member and a longitudinally extending inner magnetic pole member, said two magnets being positioned with their outer magnetic pole members substantially longitudinally aligned with each other and their inner magnetic pole members substantially longitudinally aligned with each other, with a gap between the adjacent ends of the two inner magnetic pole members for receiving between the two inner magnetic pole members a support member containing a thin liquid layer together with a plurality of magnetic particles to subject the thin liquid layer and magnetic particles to the combined magnetic field of said two magnets, each magnet having a hole extending therethrough in alignment with the gap to permit optical analysis of the thin liquid layer when a support member is received within the gap between the two inner magnetic pole members; and means for driving said first magnet with a polarity shifting current.

* * * * *